(12) United States Patent
Grubb et al.

(10) Patent No.: US 7,555,220 B2
(45) Date of Patent: Jun. 30, 2009

(54) CHROMATIC DISPERSION COMPENSATOR (CDC) IN A PHOTONIC INTEGRATED CIRCUIT (PIC) CHIP AND METHOD OF OPERATION

(75) Inventors: Stephen G. Grubb, Ellicott City, MD (US); Charles H. Joyner, Sunnyvale, CA (US); Frank H. Peters, San Jose, CA (US); Fred A. Kish, Jr., Palo Alto, CA (US); Drew D. Perkins, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 587 days.

(21) Appl. No.: 10/971,890

(22) Filed: Oct. 22, 2004

(65) Prior Publication Data

US 2005/0111848 A1    May 26, 2005

Related U.S. Application Data

(60) Provisional application No. 60/513,452, filed on Oct. 22, 2003.

(51) Int. Cl.
    *H04B 10/12* (2006.01)
(52) U.S. Cl. .............. 398/147; 398/148; 398/149; 398/158; 398/159; 398/160; 398/81; 398/82; 385/24; 385/37; 385/27; 385/123; 385/124; 385/129; 385/31; 385/11
(58) Field of Classification Search .......... 398/147, 398/148, 149, 158, 159, 161, 79, 82, 84, 398/87, 81, 160; 385/24, 37, 27, 28, 129, 385/11, 31, 123, 124
See application file for complete search history.

(56) References Cited

U.S. PATENT DOCUMENTS

| 4,750,802 A | 6/1988 | Bhagavatula |
| 5,473,719 A | 12/1995 | Stone |

(Continued)

FOREIGN PATENT DOCUMENTS

EP    1006688 A2    6/1999

(Continued)

OTHER PUBLICATIONS

Breck Hitz, "Tunable Dispersion Compensator Uses Micromirrors", Photonics Spectra, pp. 23-24, Oct. 2003.

(Continued)

*Primary Examiner*—Hanh Phan
(74) *Attorney, Agent, or Firm*—W. Douglas Carothers, Jr.; David L. Soltz

(57) ABSTRACT

An optical equalizer/dispersion compensator (E/CDC) comprises an input/output for receiving a multiplexed channel signal comprising a plurality of channel signals of different wavelengths. An optical amplifier may be coupled to receive, as an input/output, the multiplexed channel signals which amplifier may be a semiconductor optical amplifier (SOA) or a gain clamped-semiconductor optical amplifier (GC-SOA). A variable optical attenuator (VOA) is coupled to the optical amplifier and a chromatic dispersion compensator (CDC) is coupled to the variable optical attenuator. A mirror or Faraday rotator mirror (FRM) is coupled to the chromatic dispersion compensator to reflect the multiplexed channel signal back through these optical components The E/CDC components may be integrated in a photonic integrated circuit (PIC) chip.

48 Claims, 11 Drawing Sheets

U.S. PATENT DOCUMENTS

| | | | |
|---|---|---|---|
| 5,519,796 A | 5/1996 | Li et al. | |
| 5,596,448 A | 1/1997 | Onaka et al. | |
| 5,596,661 A | 1/1997 | Henry et al. | |
| 5,708,734 A | 1/1998 | Van Der Tol | |
| 5,933,270 A | 8/1999 | Toyohara | |
| 6,055,081 A | 4/2000 | Koyano et al. | |
| 6,112,000 A | 8/2000 | Bergmann et al. | |
| 6,137,604 A * | 10/2000 | Bergano | 398/1 |
| 6,154,581 A | 11/2000 | Lu et al. | |
| 6,169,838 B1 | 1/2001 | He et al. | |
| 6,181,449 B1 | 1/2001 | Taga et al. | |
| 6,332,054 B1 | 12/2001 | Ito | |
| 6,363,184 B2 | 3/2002 | Cao | |
| 6,456,411 B1 | 9/2002 | Ishikawa et al. | |
| 6,487,336 B1 | 11/2002 | Yao | |
| 6,493,502 B1 | 12/2002 | Deliwala | |
| 6,636,662 B1 | 10/2003 | Thompson et al. | |
| 6,657,186 B2 | 12/2003 | Graves | |
| 6,659,614 B2 | 12/2003 | Katayama et al. | |
| 6,690,855 B2 * | 2/2004 | Thompson et al. | 385/27 |
| 6,785,043 B2 * | 8/2004 | Hwang et al. | 359/337.5 |
| 6,912,362 B1 * | 6/2005 | Takiguchi et al. | 398/158 |
| 6,920,261 B2 * | 7/2005 | Inada et al. | 385/24 |
| 7,062,173 B2 * | 6/2006 | Tomofuji et al. | 398/82 |
| 7,155,124 B2 * | 12/2006 | Peddanarappagari et al. | 398/37 |
| 7,200,333 B2 * | 4/2007 | Katagiri et al. | 398/81 |
| 2002/0005970 A1 | 1/2002 | Lang | |
| 2002/0071155 A1 | 6/2002 | Inada et al. | |

FOREIGN PATENT DOCUMENTS

| | | |
|---|---|---|
| EP | 1006688 A2 | 6/2000 |
| WO | WO02/098026 A1 | 12/2002 |

OTHER PUBLICATIONS

Takiguchi et al., "Dispersion Compensation Using a Planar Lightwave Circuit Optical Equalizer", IEEE Photonics Technology Letters, vol. 6(4), pp. 561-564, Apr. 1994.

* cited by examiner ns with optical signal equalization and/or chromatic dispersion (CD) compensation and/or polarization mode dispersion (PMD) compensation for optical signals and more particularly to optical equalizers/dispersion compensators in photonic integrated circuit (PIC) chips.

CHROMATIC DISPERSION COMPENSATOR (CDC) IN A PHOTONIC INTEGRATED CIRCUIT (PIC) CHIP AND METHOD OF OPERATION

REFERENCE TO A RELATED APPLICATION

This application claims priority to provisional application, Ser. No. 60/513,452, filed Oct. 22, 2003, which provisional application is incorporated herein by its reference.

BACKGROUND OF THE INVENTION

1. Field of the Invention

This invention relates generally to WDM or DWDM systems with optical signal equalization and/or chromatic dispersion (CD) compensation and/or polarization mode dispersion (PMD) compensation for optical signals and more particularly to optical equalizers/dispersion compensators in photonic integrated circuit (PIC) chips.

2. Description of the Related Art

It is known in the art to provide for optical signal equalization as well as dispersion compensation relative to optical signals propagating in a WDM optical communication network. By including optical signal equalization as well as optical signal compensation, albeit chromatic dispersion compensation or polarization mode dispersion or both, in an optical transmission fiber, it provides the possibility for the optical signals to be transmitted a further distance along the transmission fiber without requiring optical signal amplification, such as through a mid-span optical amplifier, for example, with an EDFA. With proper signal equalization and substantial dispersion compensation, it is possible to bypass or skip, i.e., not deploy a mid-span optical-to-electrical-to-optical regenerator (OEO REGEN), thereby costs that would be incurred with an OEO REGEN rather than a less expensive EDFA. This is referred to by some carrier providers and their equipment manufacturers as a "skip-1" feature, wherein with proper addressing of signal equalization and dispersion compensation, the requirement for a mid-span OEO REGEN network node can be "skipped" at least by one or more of such optical amplifiers with proper signal equalization and/or dispersion compensation at a transmission point where such a node would normally be required.

For long-haul transmission, a variation in optical signal amplitude and strength varies over long distances for different wavelengths in accordance with the nonlinearities of the transmission line, i.e., the strength of the different channel signals propagating at different frequencies respectively vary with the transmission loss characteristics of the transmission fiber. Thus, means are provided to compensate for this by providing mid-span signal amplification and equalization. Such equalization systems are taught in U.S. Pat. Nos. 6,487,336; 6,493,502 and 5,933,270 as well as in FIG. 9, for example, of U.S. patent application, Publication No. 2002/0071155, published Jun. 15, 2002.

By the same token, dispersion compensation is provided to the individual optical signals to suppress waveform deterioration of the signals along the transmission fiber, particularly as the rate of transmission is increased. Compensation can be provided by providing an appropriate phase shift to the optical signals, deploying dispersion compensating fibers, deploying bandwidth or linewidth filters or etalons (such as Gires-Toumois etalons), deploying Bragg gratings or providing different path lengths for different optical signals to make corrections either statically or dynamically. Such systems are, in part, disclosed in U.S. Pat. Nos. 4,750,802; 5,473,719; 6,363,184; and 6,137,604 as well as in U.S. patent applications, Publication Nos. 2002/0102052, published Aug. 1, 2002 and 2002/0159701, published Oct. 31, 2002.

All of these examples of equalizers and compensators, except possibly for Publication No. 2002/0102052, are comprised of discrete devices coupled via optical fibers and discrete optical components which render their alignment and final assembly labor intensive forming large size systems that are expensive to manufacture and implement. In Publication No. 2002/0102052, the planar waveguide dispersion compensator illustrates an AWG combined with a path length adjuster employing thermally adjusted lens strips with an array of waveguides in silica that are optically coupled to the AWG. While the planar waveguide dispersion compensator is shown in a single device, a portion of it is external to the device (an index matched medium and a reflector) and the manufacture of such a device would be complex in silicon in forming the AWG/dispersion compensation region as an integrated device. As mentioned in this publication, dispersion is compensated by splitting a respective channel signal into a plurality of component signals having fractional differences in wavelength, $$\frac{\Delta\lambda}{\lambda},$$

which fractional differences are small compared to the ratio of the wavelength to the maximum group delay length. Then, a small fractional adjustment, $$\frac{\delta\phi}{\Delta\phi},$$

is applied to the relative phase of each component signal. An adjustment in the signal phase for each signal by an induced relative phase shift, $\Delta\phi$, which varies symmetrically outward from the center of the component signal array. This is performed in the path length adjuster where the path lengths may be varied by the application of heat to change the refractive index of the paths traveled by the component signals.

Also, in Publication No. 2002/0102052, an alternative embodiment is illustrated in FIG. 4B wherein a separate reflector is not utilized but instead, the component channel signals are fed into a second AWG having matched characteristics to those of the first AWG. The second AWG can be folded back on itself as an alternative version. In any case, this approach offers new and different optical components to perform the function of dispersion compensation. However, it would be more desirable to utilized more standard compensator components or components that can be easily integrated on a single photonic integrated circuit (PIC) chip.

Reference is also made to FIG. 1 which discloses a WDM channel equalization/compensator device 10 comprising multiple discrete electro-optic (active) and passive optical components. Such a device 10 is illustrated in U.S. Pat. No. 6,487,336, which is incorporated herein by its reference. As shown in FIG. 1, a transmitted multiplexed signal, $\lambda_1$, $\lambda_2$, ..., $\lambda_N$, on an optical span 11 is directed to multiplexer/demultiplexer (MUX/DEMUX) 14 via circulator 12 and optical fiber 13 where the signal is demultiplexed into separate signal channels 15 which number the amount of signal channels, i.e., N channel signals. The separate channel signals are then attenuated by in-fiber variable optical attenuators (VOAs) 16 which are deployed to independently adjust and control the power levels of the channel signals and provide for power equalization across the channel array where equal power in the channels is desired. The signals then pass through Faraday rotators (FRs) 17 where the polarization mode is rotated 45°. Then, the signals are reflected at reflector 18 and again pass through the Faraday rotators (FRs) 17 and VOAs 16 so that the polarization mode of the respective signals are again rotated 45° and the signals are again attenuated for the second time. The signals are then multiplexed at MUX/DEMUX 14 and provided as an output on fiber 13 where they are placed on output fiber span 19. Thus, the Faraday rotation of 90° relative to each channels signal is accomplished so that the reflected signals are essentially orthogonal to the polarization of the original signals such that any polarization-dependent loss (PDL) with respect to two orthogonal polarizations is substantially eliminated. Also, the attenuators 16 are properly controlled to result in the second channel signals to be all approximately the same power.

Of higher desirability is a channel equalizer/compensator that can be included on a single PIC chip that also can perform chromatic dispersion (CD) compensation in addition to, or alternatively to, polarization mode dispersion (PMD).

OBJECTS OF THE INVENTION

Therefore, it is an object of the present invention to overcome the aforementioned problems.

Another object of this invention is the provision of a mid-link chromatic dispersion (CD) compensator that can provide more effective functionality over an optical fiber amplifier to provide for a "skip 1" installation.

Another object of this invention is to miniaturize a channel chromatic dispersion compensator (CDC) device or a channel equalizer/chromatic dispersion compensator (E/CDC) device as much as possible, and completely integrate all components on a single photonic integrated circuit (PIC) chip.

SUMMARY OF THE INVENTION

According to this invention, an optical equalizer/chromatic dispersion compensator (E/CDC) comprises an input/output for receiving a multiplexed channel signal comprising a plurality of channel signals of different wavelengths. An optical amplifier may be coupled to the input/output and may be a semiconductor optical amplifier (SOA) or a gain clamped-semiconductor optical amplifier (GC-SOA). A variable optical attenuator (VOA) is coupled to the optical amplifier and a chromatic dispersion compensator (CDC) is coupled to the variable optical attenuator. A mirror or Faraday rotator mirror (FRM) is coupled to the chromatic dispersion compensator to reflect the multiplexed channel signal back through optical components comprising the chromatic dispersion compensator, the variable optical attenuator and the optical amplifier so that the multiplexed channel signal is corrected partially for equalization and chromatic dispersion compensation with respect to each pass through these optical components.

According to another aspect of this invention, optical components comprising an optical amplifier, a variable optical attenuator and a chromatic dispersion compensator (CDC) or CDC device as well as the mirror are integrated in a monolithic photonic integrated circuit (PIC) chip. The CDC may include a Mach-Zehnder interferometer (MZI) or a cascaded group of Mach-Zehnder interferometers, or at least one arrayed waveguide grating (AWG) or an Echelle grating. Where the mirror is a Faraday rotator mirror (FRM), this component is butt coupled to the rear facet of the chip to receive the optical output from the CDC.

An important aspect in at least some of embodiments of this invention is the deployment of a CDC device that separates or demultiplexes a multiplexed signal $\lambda_1 \ldots \lambda_N$ into individual multiple wavelength channel components rather than into individual channel signals which are much finer than a regular signal channel itself over a free spectral range (FSR) spanning only the channel width, such as 50 GHz, 100 GHz or 200 GHz. These components are subjected to a phase shift to change the group delay of the channel signals when recombined from the channel signal components. The induced phase shifts on the components provides for an opposite group delay achieving channel signal pulse narrowing. Thus, CDC device samples wavelengths across a finite signal linewidth of each channel signal in the group of multiplexed channel signals forming the signal components and imposes a longer path length for shorter wavelengths and a shorter path length for longer wavelengths so that when the signal components are recombined the signal components are substantially realigned replicating to some extent their original pulse width. Such a CDC may include a Mach-Zehnder interferometer (MZI) or a cascaded group of Mach-Zehnder interferometers, or at least one arrayed waveguide grating (AWG) or at least one Echelle grating.

According to another aspect of this invention, a photonic integrated circuit (PIC) chip comprises an input into the chip that receives at least one channel signal having experienced chromatic dispersion, a chromatic dispersion compensator (CDC) that separates the at least one channel signal into separate wavelength components over a free spectral range (FSR) spanning only a signal channel width and subjects the wavelength components to a phase shift to change the wavelength group delay in the wavelength components and that recombines the wavelength components to reconstitute the at least one channel signal, and an output from the chip for the recombined at least one channel signal having reduced chromatic dispersion compared to the same channel signal received at the chip input. The CDC device may include a tuning section to vary the phase shift of wavelength components as they propagate through the device.

According to another aspect of this invention, optical equalizer/dispersion compensator (E/CDC) comprises an input for receiving a multiplexed signal comprising a plurality of multiplexed channel signals of different wavelengths, a demultiplexer coupled to receive the multiplexed signal to demultiplex into individual wavelength components which are placed on respective waveguide arms of differing length. Each of the waveguides may also include an optical amplifier coupled to receive a corresponding channel signal. Such an optical amplifier may be a semiconductor optical amplifier (SOA) or a gain clamped-semiconductor optical amplifier (GC-SOA). The SOA may be followed by a variable optical attenuator (VOA) coupled to the optical amplifier and a chromatic dispersion compensator (CDC) which is coupled to the variable optical attenuator. Outputs from each of the chromatic dispersion compensators are coupled to a multiplexer to recombine the channel signals as a single multiplexed channel signal for output. Almost all of the disclosed optical components may be integrated in a monolithic photonic integrated circuit (PIC) chip.

Other objects and attainments together with a fuller understanding of the invention will become apparent and appreciated by referring to the following description and claims taken in conjunction with the accompanying drawings. The drawings are not necessarily to scale so that emphasis instead is placed on the principals and features of the invention.

BRIEF DESCRIPTION OF THE DRAWINGS

In the drawings wherein like reference symbols refer to like parts.

DETAILED DESCRIPTION OF THE INVENTION

Figure 2:
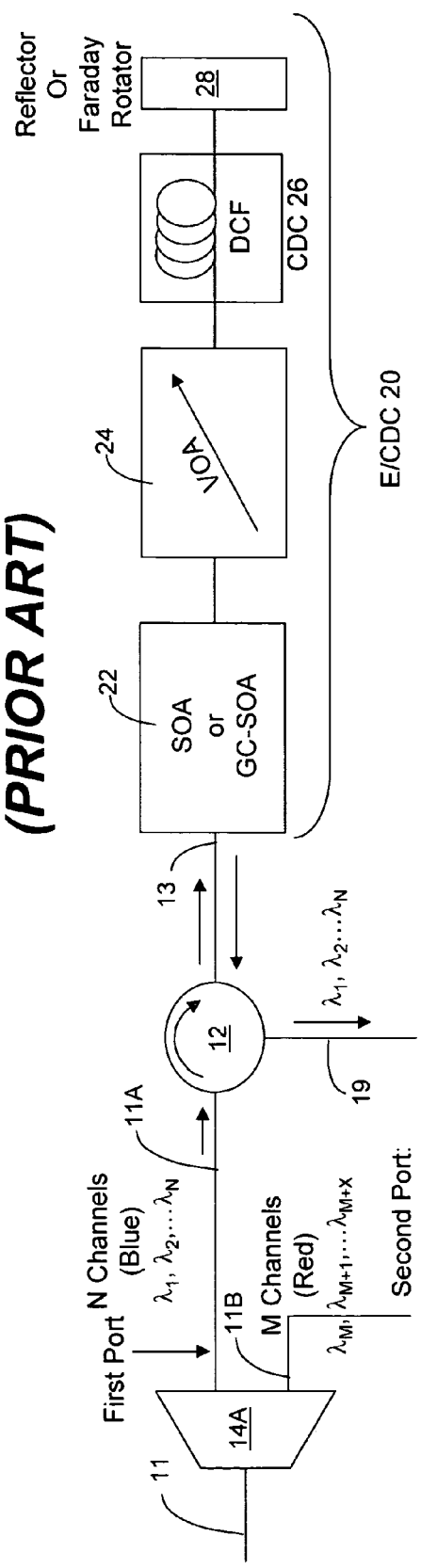
FIG. 2 is a first embodiment of this invention.

Reference is now made to FIG. 2 which illustrates a first embodiment of this invention comprising equalizer/chromatic dispersion compensator (E/CDC) 20. The incoming wavelength bands of multiplexed signals on optical transmission span 11 of an optical transmission network are received at channel signal band demultiplexer 14A were N channels, $\lambda_1, \lambda_2, \ldots, \lambda_N$, that are in a low wavelength band of wavelengths, such as the low end of the C band, are received at a first port on fiber line 11A. On the other hand, M channels, $\lambda_M, \lambda_{M+1}, \ldots, \lambda_{M+X}$, that may be of a higher wavelength band of wavelengths in the C band or a group of wavelengths in the L band, are received at a second port on fiber line 11B. N channels, $\lambda_1, \lambda_2, \ldots, \lambda_N$, are provided, via optical circulator 12, onto input fiber 13 to E/CDC 20. While circulator 12 is shown as a coupling element for transferring and receiving signals, $\lambda_1, \lambda_2, \ldots, \lambda_N$, it is well known in the art that other optical components may be deployed at this point, such as, for example, a dichroic mirror device or a directional coupler. Also, a Faraday rotator may be integrated into circulator 12.

Figure 1:
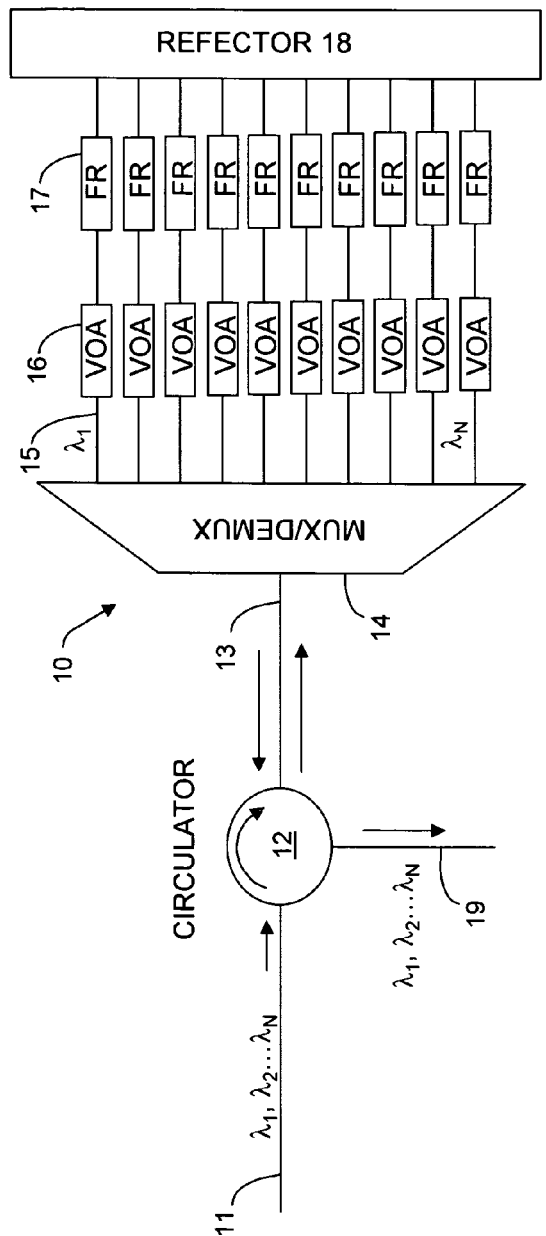
FIG. 1 is a representation of a combination of FIGS. 1 and 3B from U.S. Pat. No. 6,487,336.

E/CDC 20 comprises, in sequential optical coupling, semiconductor optical amplifier (SOA) 22, variable optical attenuator (VOA) 24, CDC 26 comprised here of a half spool of dispersion compensating fiber (DCF), and reflector or Faraday rotator mirror (FRM) 28. The incoming signal to be compensated for chromatic dispersion is, first, amplified by SOA 22. SOA 22 may also preferably be a gain-clamped SOA (GC-SOA), which is also sometimes referred to as a semiconductor laser amplifier. GC-SOA 22 may provide, for example, 15-20 dB uni-directional gain and provide a reflected output signal power on fiber line 13 of about +10 dBm which means about −3 dBm for 20 signal channels. VOA 24 provides attenuation to the incoming multiplexed signal as well as the reflected output signal and may provide a tilted gain profile across the signal spectrum to equalize the gain across the signal channels, taking into account the fact that the combined signal is reflected back through VOA 24 again via reflector 28. This same characteristic is true for DCF 26 which is expensive to deploy. However, since the combined signal will traverse DCF twice, a half spool or half as much of the dispersion compensating fiber need be employed, reducing the cost of this mid-span, "skip 1" signal E/CDC 20. This is true in spite of the fact that an expensive circulator 12 is also employed which is also the case in the known prior embodiment illustrated in FIG. 1. Moreover, as will be seen from later embodiments, the expense of a circulator 12 as well as dispersion compensating fiber (DCF) can both be eliminated.

As known to those skilled in the art, "skip N" designates the number of times, N, that a propagating combined signal, $\lambda_1, \lambda_2, \ldots, \lambda_N$, requires to be 3R conditioned, i.e., optical-electrical-optical (OEO) regeneration comprising the process of re-amplifying (correcting loss), reshaping (correcting noise and dispersion), retiming (synchronizing with the network clock), and, thereafter, retransmitting the recombined channel signals. E/CDC 20 disclosed here, and more so in later embodiments, can provide a skip 1 device that effectively and efficiently replaces an EDFA that are presently employed for such skips which are limited to channel signal re-amplification of the combined signals or 1R whereas E/CDC 20 provides further functions comprising channel signal equalization as well as chromatic dispersion compensation (reshaping) or 2R. The rejuvenated combined channel signals, $\lambda_1, \lambda_2, \ldots, \lambda_N$, exit GC-SOA 22 and are directed by optical circulator 12 to an output 19 and back onto the same or different optical link.

It should be noted that the M signal channels may also be provided for signal equalization and compensation to another E/CDC (not shown) or for OEO regeneration through a digital amplifier as defined and disclosed in U.S. patent application, Ser. No. 10/267,212, supra.

Additional advantages of the E/CDC 20 of FIG. 2 are that it provides for a relatively compact compensator and amplifier for a multiple N wavelength channel system, such as 10 channels or more. Also, the system is upgradable, capable of handling, later on, additional channel signals, for example, such as an upgrade from 10 signal channels to 40 signal channels. Also, the double pass configuration of E/CDC 20 renders it possible to handle a wider range of span losses as well as provides for chromatic dispersion. Further, the use of the double pass configuration reduces some costs over a single-pass dispersion compensator by reducing the total amount of DCF required, possibly by as much as 40% for device 20 since only half as much is needed. Also, as previously indicated, the double pass configuration has the benefit of employing half of the quantity of DCF required and the use of the Faraday rotator mirror 28 reduces polarization effects, such as reducing polarization dispersion gain (PDG) and polarization dispersion loss (PDL) between orthogonal propagating polarization modes of the channel signals. Lastly, M signal channels at the second port at 11B may also be provided to a digital add/drop node, such as illustrated in patent application, Ser. No. 10/267,212, supra, particularly in FIGS. 17 and 18, to provide for signal add/drop capability.

Figure 3:
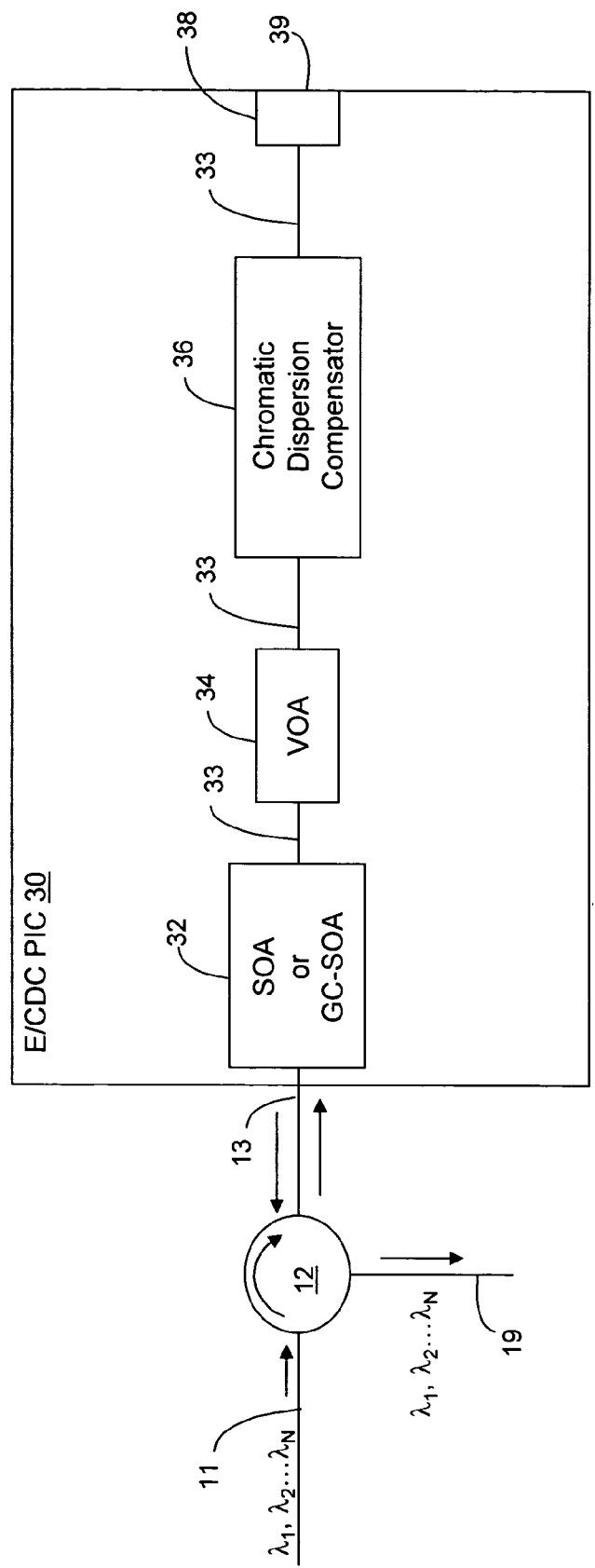
FIG. 3 is a second embodiment of this invention.

Reference is now made to FIG. 3 which discloses another embodiment of this invention. A principal feature of the FIG. 3 embodiment is that the illustrated equalizer/dispersion compensator is entirely integrated as a photonic integrated circuit (PIC) on a single E/CDC chip 30, such as an In-based semiconductor chip (InP/InGaAsP alloy system or InP/AlIn-GaAs alloy system). Similar PIC chips with one or more of the individual optical components disclosed herein in integrated form are also disclosed and described in other integrated forms or versions with other optical components, except for CDC 36 and mirror 38, in U.S. patent applications, Ser. No. 10/267,331, Ser. No. 10/267,212, supra, and Ser. No. 10/267,304, supra. E/CDC PIC chip 30 comprises, as integrated active and passive optical components optically coupled together as indicated at 33, SOA or GC-SOA 32, VOA 34, CDC 36 and mirror 38 which may be a facet of E/CDC PIC chip 30. Alternatively, mirror 38 may be an integrated grating reflector or a Faraday rotator mirror. In operation, the incoming combined signal, $\lambda_1, \lambda_2, \ldots, \lambda_N$, on input fiber line 13 to E/CDC chip 30 are initially amplified by GC-SOA 32, attenuated in a manner as previously explained in connection with embodiment of FIG. 2, provided with dispersion compensation at 36 and then reflected at mirror 38 to again be compensated, attenuated at 34, as necessary, and amplified at 32. Since the combined channel signals are reflected, the active components 32 and 34 need not, respective, be of high power or extended attenuation but rather perhaps at half of their capability to perform their respective functions. By the same token, E/CDC chip 30 does not have to be a longer device than required since the signals will pass through compensator 36 twice to receive chromatic dispersion compensation. CDC 36 may be, for example, a Mach-Zehnder interferometer (MZI) or cascaded MZIs, a grating reflector, SOA induced chirp, an arrayed waveguide grating (AWG), Echelle grating or cascaded AWGs, or AWGs with Echelle gratings in one or more free space regions of the AWG. Some of these devices will be discussed later in more detail together with their accompanying figures.

It can readily be seen that E/CDC PIC chip 30 provides for a cost effective approach in addressing 2R signal rejuvenation compared to the employment of an EDFA addressing 1R in a skip 1 situation.

In the case of mirroring the channel signals in the PIC chip 30 of FIG. 3, the mirror may be the back facet 39 of chip with a HR coating formed on its surface. In the case of a Faraday rotator mirror (FRM), this FRM device comprises a structure that is butt coupled to the back facet 39. Such a device may be comprised of rare-earth iron garnets or a magnetic garnet crystal (YIG), or other optical FRM as known in the art.

It should be understood that an important feature of this invention is increased gain in the compensator of FIG. 2 or FIG. 3 by deploying a facet mirror, a Faraday rotator mirror (FRM) or a grating reflector. Another advantage is the increase of the amount of phase shift that can be achieved in the CDC 26 or 36 comprising a Mach-Zehnder interferometer (MZI) thereby only necessitating one fiber coupling in the compensating system at line 13, which results in reduce costs.

Also, it should be noted that it is within the scope of this invention to replace the VOA, such as VOAs 24, 34, or 52 as shown relative to the embodiment to be described in connection with FIG. 5, by varying the gain on SOAs 22, 32 or 52 in lieu of the use of VOAs 24, 34 04 52. However, in situations where it is desired to have a greater dynamic range, or if it is desired to operate the SOAs at a constant gain, then the embodiments of FIGS. 2-4 and 6 are preferred.

Figure 4:
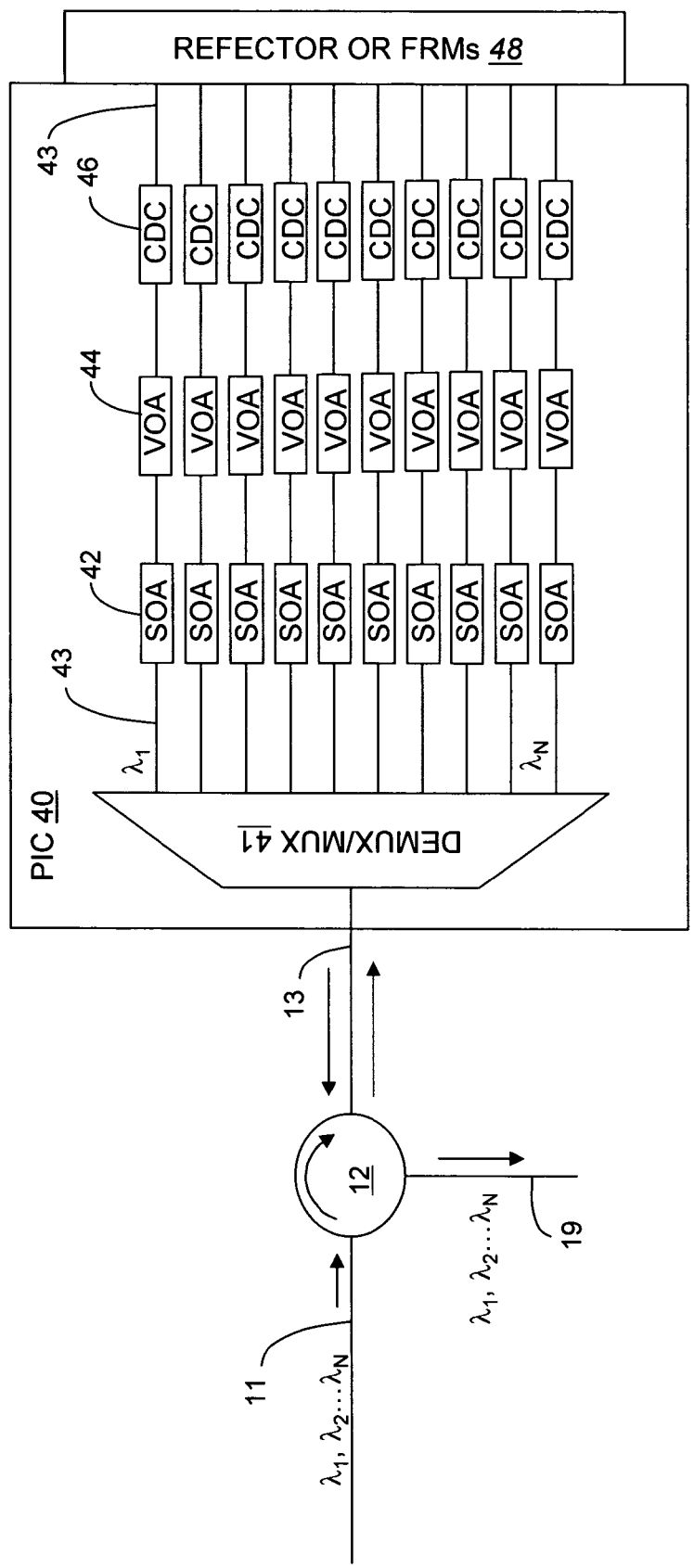
FIG. 4 is a third embodiment of this invention comprising an expanded multichannel version of the second embodiment shown in FIG. 2.

Reference is now made to the embodiment shown in FIG. 4. The PIC 40 of FIG. 4 is similar in function to PIC 30 in FIG. 3 except that in FIG. 4, the combined channel signal is first demultiplexed in a plurality of N channel signals for re-amplification, equalization and dispersion compensation. PIC 40 receives the combined signal, $\lambda_1, \lambda_2, \ldots, \lambda_N$, from fiber 13 where the combined signal is first demultiplexed at DEMUX/MUX 41 and the separated N signals are respectively provided on a corresponding waveguide 43. The respective channel signals are then amplified by a corresponding GC-SOA 42, partially attenuated by a corresponding VOA 44 according to required equalization across the signal spectrum, and thereafter provided with chromatic dispersion compensation by a corresponding compensator 46. The amplified, equalized and compensated channel signals need only be partly processed as they are then reflected at 48 and are further compensated, equalized and amplified by PIC chip 40. As pointed out above, these components need not, therefore, be of high treatment value since chip 40 creates an integrated double-pass system for such signal amplification, equalization and compensation. As in the case of previous embodiments, mirror 48 may also include polarization compensation by means of a combination Faraday rotator and mirror (FRM) at 48. In such a case, PIC 40 provides for correction of both chromatic dispersion and polarization mode dispersion. The returning compensated channel signals are then recombined at DEMUX/MUX 41 and the multiplexed signal, $\lambda_1, \lambda_2, \ldots, \lambda_N$, is provided as an output on fiber line 13 via circulator 12 to output line 19 as in the case of previous embodiments.

Relative to the forging embodiments of FIGS. 3 and 4, instead of having a Faraday rotator or FRM coupled with the E/CDC device 20 or 30, such a PMD compensator can be integrated as part of circulators 12, which is exemplified in the circulators disclosed in U.S. Pat. No. 6,154,581, which patent is incorporated herein by its reference.

While the foregoing embodiments provide for signal equalization and CDC for combined signal amplification, equalization and compensation, it is also within the scope of this invention to utilize a PIC chip to perform these functions or some of these functions relative to individual channel signals that initially decombined and then recombined the rejuvenated channel signals before further transmission on an optical link or span. Examples of such PIC chips are shown in FIGS. 5-8. In FIGS. 5 and 6, the PIC chips have separated inputs and outputs ("pass-through" configurations) whereas in FIGS. 7 and 8, the PIC chips signal channel inputs are also the chip outputs. Also, in the event where high gain is not required in the PIC compensator of FIG. 3 or 4, where gain is compensated for by multiple SOAs or other such multiple gain means, the advantages of increased dispersion compensation ability is not required so that the compensated channel signals may then be taken out of the back or opposite facet as illustrated, for example, in FIGS. 5 and 6.

Figure 5:
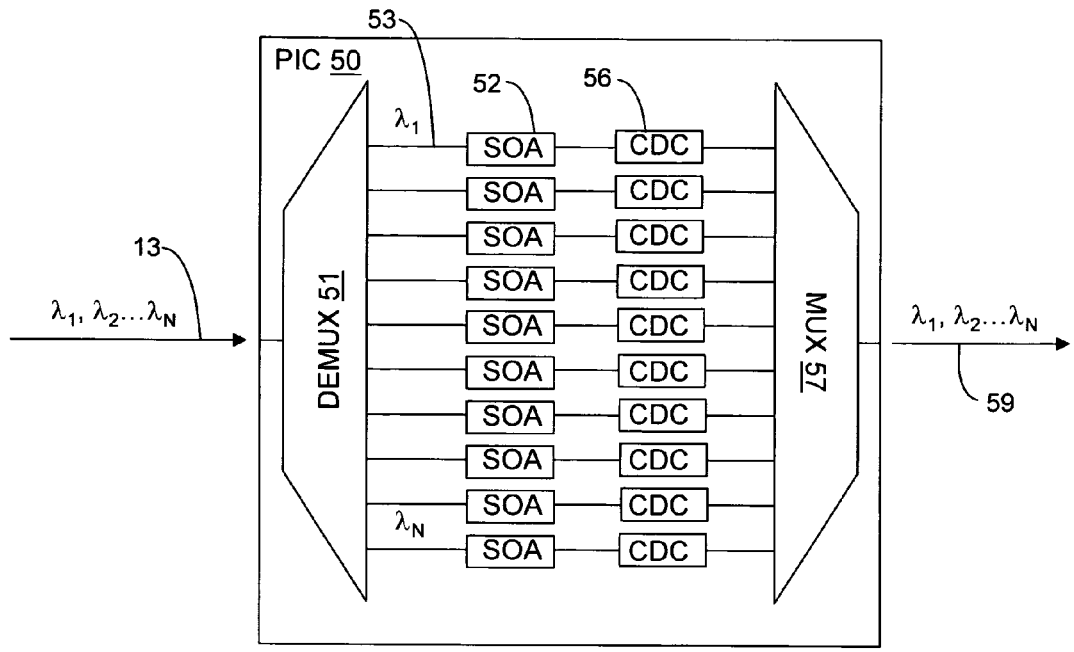
FIG. 5 is a first alternate version of the third embodiment shown in FIG. 4.
Figure 6:
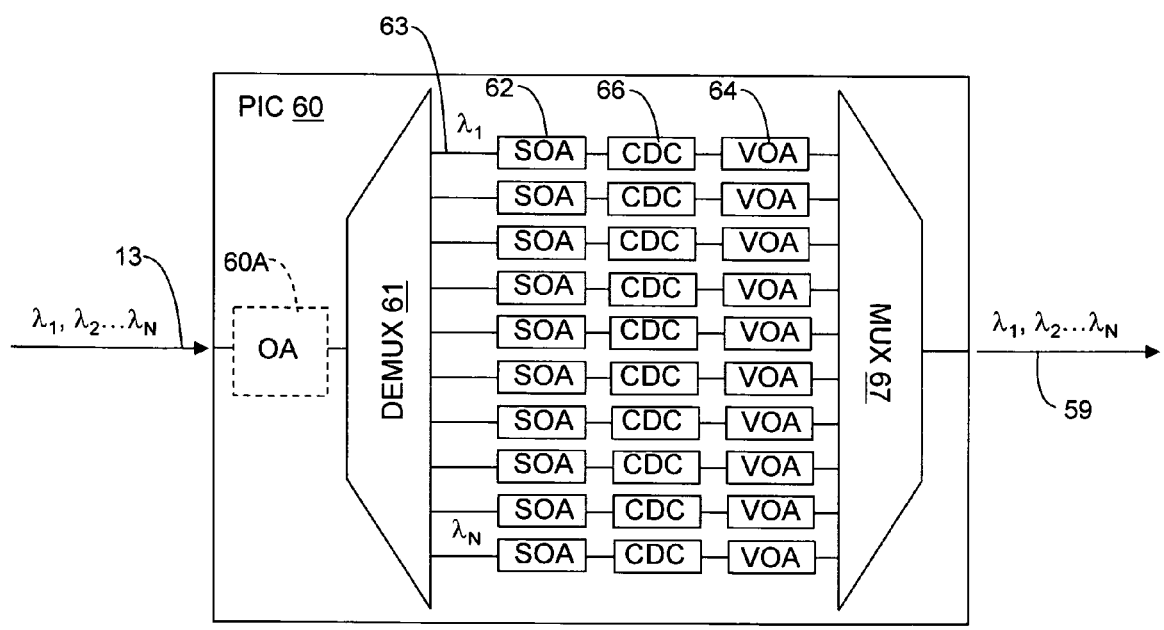
FIG. 6 is a second alternate version of the third embodiment shown in FIG. 4.

In FIG. 5, PIC chip 50 comprises an integrated array of optically coupled components for receiving N multiplexed signal channels, $\lambda_1, \lambda_2, \ldots, \lambda_N$, on input fiber 13 to PIC 50 comprising an on-chip DEMUX 51 with outputs comprising a plurality of waveguides 53 equal to N signal channels where each waveguide 53 receives a demultiplexed single channel signal. Each of the waveguides 53 includes an SOA or GC-SOA 52 and a dispersion compensator 56. After amplification of the individual signals and chromatic dispersion compensation, the N channel signals are recombined via on-chip MUX 57 and provided on optical link or span 59 for propagation to a next node. DEMUX 51 and MUX 57 may be arrayed waveguide gratings (AWGs) or Echelle gratings as exemplified in U.S. patent application, Ser. No. 10/267,331, supra. In subsequent figures, the multiplexers and demultiplexers in the illustrated PIC chips may also be comprised of other such wavelength selective combiners and decombiners as also exemplified in U.S. patent application, Ser. No. 10/267,331, supra.

The embodiment of FIG. 6, comprising PIC chip 60, is similar to the embodiment of FIG. 5 except that variable attenuation is included via the array of VOAs 64. PIC chip 60 comprises an integrated array of optically coupled components for receiving N multiplexed signal channels, $\lambda_1, \lambda_2, \lambda_N$, on input fiber 13 to PIC 60 comprising an on-chip DEMUX 61 with outputs comprising a plurality of waveguides 63 equal to N signal channels where each waveguide 63 receives a demultiplexed single channel signal. Each of the waveguides 63 includes an SOA or GC-SOA 62, a dispersion compensator 66 and a VOA 64. After amplification of the individual channel signals, chromatic dispersion compensation and signal equalization, as previously explained, the N channel signals are recombined via on-chip MUX 67 and provided on optical link or span 59 for propagation to a next node. PIC chip 60 may optional include an optical amplifier 60A at the input of the chip to provide additional gain to the combined channel signal prior to additional processing via chip 60. Optical amplifier 60A may be, for example, a SOA or a GC-SOA. Amplification can also alternatively be Off-chip with an external optical fiber amplifier at the input of PIC chip 60.

Figure 7:
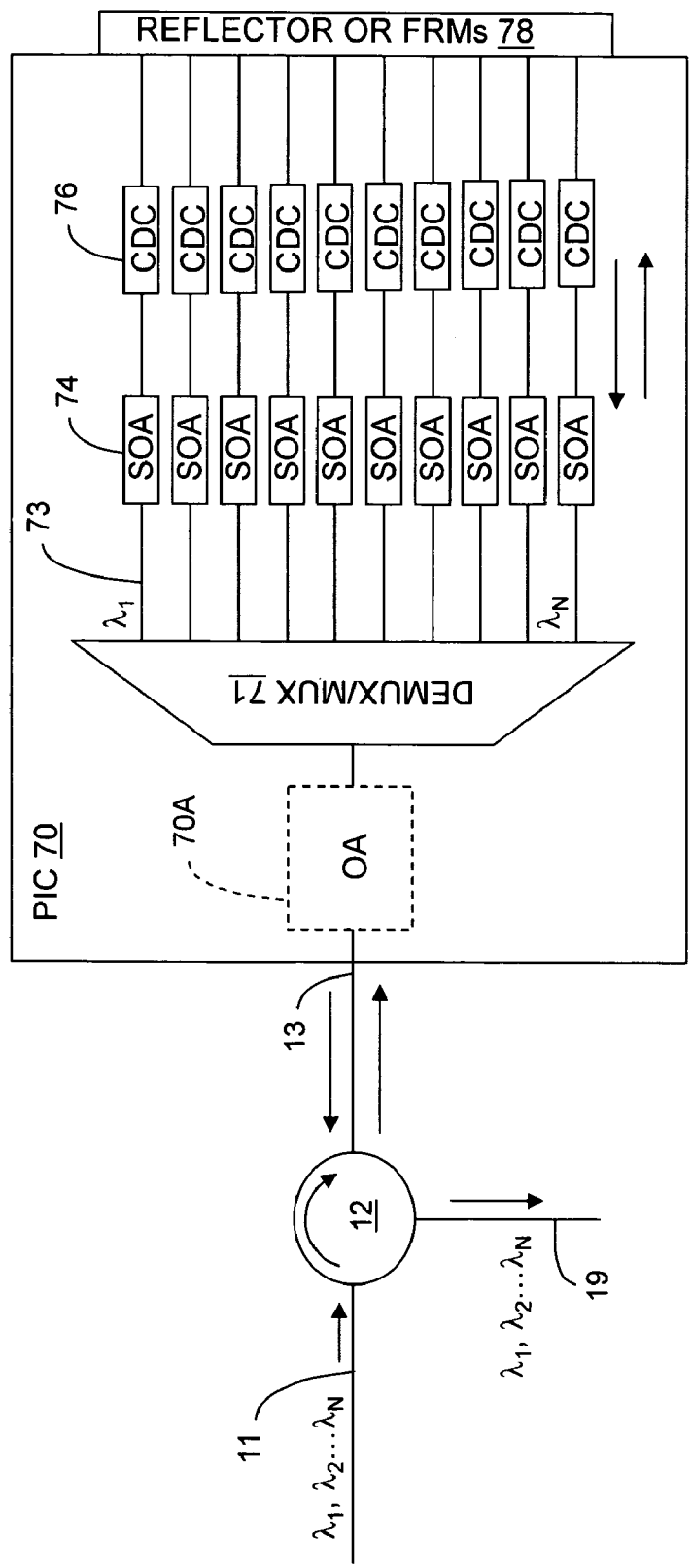
FIG. 7 is a third alternate version of the third embodiment shown in FIG. 4.

The embodiment of FIG. 7 is similar to the embodiment of FIG. 4 in connection with the aspect that the output of PIC chip 70 is also its input via fiber coupling line 13. However, the embodiment in FIG. 7 does not include signal equalization for each of the demultiplexed channel signals. PIC chip 70 comprises DEMUX/MUX 71, plural waveguides 73 wherein each respective waveguide 73 includes an on-chip SOA or GC-SOA 74 and a CDC 76. Thus, the demultiplexed signals on a first pass through chip 70 are respectively amplified and dispersion compensated and then on a reverse pass through chip 70 are further respectively dispersion compensated and amplified, after which they are recombined at DEMUX/MUX 71 and provided as a recombined channel signal output on fiber line 13 to output 19 via circulator 12. Optionally, chip 70 may also include an optical amplifier 70A at its input/output to provide additional gain to the combined channel signal prior to as well as after processing on chip 70. Optical amplifier 70A may be, for example, a SOA or a GC-SOA. As previously indicated above, such amplification can also be off-chip via an optical fiber amplifier.

Figure 8:
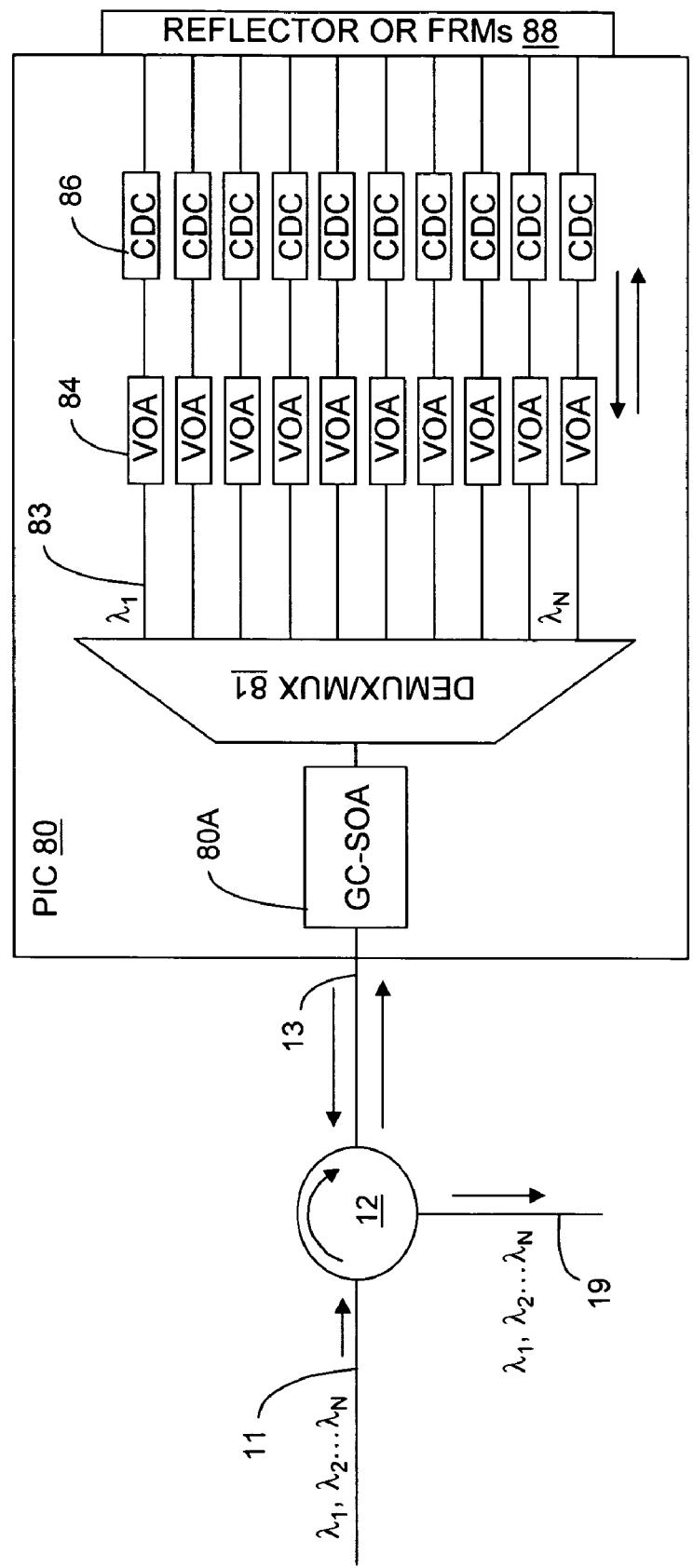
FIG. 8 is a fourth alternate version of the third embodiment shown in FIG. 4.

Reference is now made to the embodiment illustrated in FIG. 8 which comprises PIC chip 80. PIC chip 80 has at its input an optical amplifier comprising GC-SOA 80A to amplify the incoming multiplexed signal prior to processing. The amplified signal then is demultiplexed via DEMUX/MUX 81 into separate channel signals, $\lambda_1, \ldots, \lambda_N$, on PIC waveguides 83 where the signals are first partially equalized via VOAs 84 and then partially chromatic dispersion compensated via compensators 86. The signals are then reflected at mirror 88 and return through CDCs 86 and VOAs 84 for completion of chromatic dispersion compensation and signal equalization, after which the channel signals are recombined via DEMUX/MUX 81 and again amplified by GC-SOA 80A and finally placed on fiber line 13 to be presented at output 19 via circulator 12. As in the case of previous embodiments, instead of deploying a mirror or reflector 88, a Faraday rotator in combination with a mirror may be deployed at 88 to provide for polarization mode dispersion or PMD compensation with respect to both gain and loss in the mode orthogonal polarization modes, one relative to the other. There is a double passage through the Faraday rotators to perform this equalization or polarization mode dispersion. Note also that PIC 80 differs from the PICs 40 and 70 in not including separate SOAs for amplifying the demultiplexed channel signals on PIC chip 80. Rather, the incoming and outgoing multiplexed channel signals are amplified by GC-SOA 80A.

As previously indicated, all the PIC chip embodiments can be fabricated employing Group III-V alloy materials, in particular, an InGaAsP/InP alloy regime or an AlInGaAs/InP regime as exemplified for such components in the previously incorporated patent applications, Ser. No. 10/267,331 and 10/267,304, supra.

Figure 9:
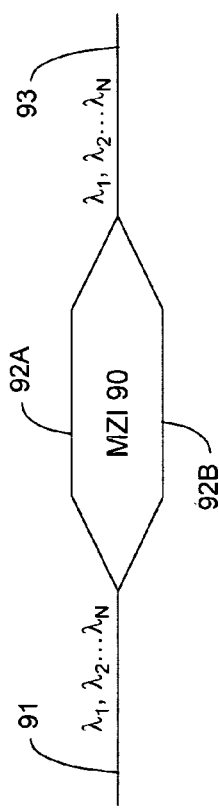
FIG. 9 is a first type of chromatic dispersion compensator (CDC) that may be employed in any of the embodiments shown in FIGS. 3-8.

Reference is now made to FIG. 9 which illustrates a Mach-Zehnder interferometer (MZI) 90 that may deployed as the chromatic dispersion compensator 36, 46, 56, 66 76 and 86 in the embodiments of FIGS. 3-8. MZI 90 is a standard MZ interferometer integrated on the PIC chip, such as illustrated previously in U.S. application, Ser. No. 10/267,331, supra., and has, as shown, an input for the multiplexed channel signals, $\lambda_1, \ldots, \lambda_N$, which signals are split between arms 92A and 92B and thereafter recombined on output 93. The phase of the signals in the respective arms 92A and 92B may be adjusted to provide partial compensation for chromatic dispersion compensation and upon reflection and return through MZI 90 provide additional chromatic dispersion compensation to channel signals, $\lambda_1, \ldots, \lambda_N$.

Further, it is within the scope of this invention that MZIs be cascaded, i.e., serially coupled or treed, for utilization in the performance of chromatic dispersion compensation. An example of the deployment of cascaded MZI as an optical chromatic dispersion compensator for any of the previous embodiments disclosed in the article of Koichi Takiguchi et al. entitled, "Dispersion Compensation Using Planar Lightwave Circuit Optical Equalizer", IEEE Photonics Technology Letters, Vol. 6(4), pp. 561-564, April 1994, which article is incorporated herein by its reference. The MZI structure of Takiguchi et al. is illustrated relative silica waveguide embodiments. However, such structures can be also fabricated in InP/InGaAsP or InP/AlInGaAs based alloy systems. As taught by Takiguchi et al., the cascaded MZI compensator can be adjusted to provide variable phase control to adjust for both positive and negative values of chromatic dispersion.

Figure 10:
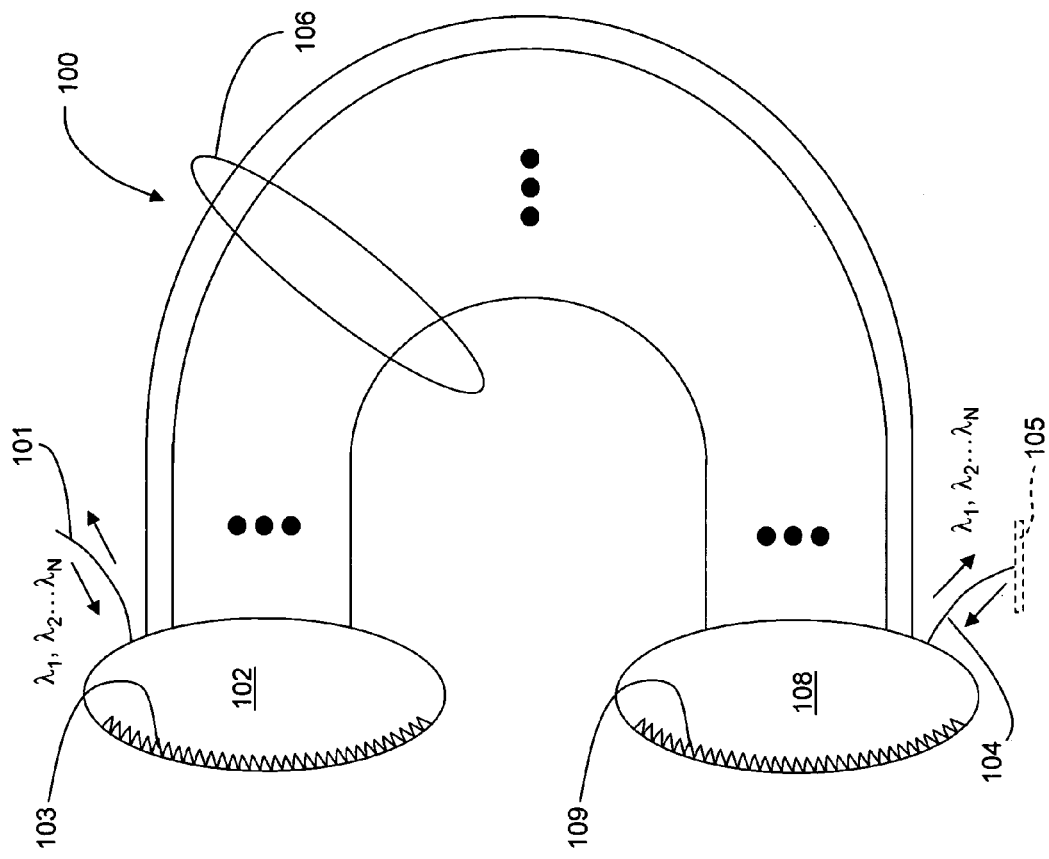
FIG. 10 is a second type of a chromatic dispersion compensator (CDC) that may be employed in any of the embodiments illustrated in FIGS. 3-8.

FIG. 10 illustrates another chromatic dispersion compensator (CDC) device 100 that may be integrated on PIC chips of the previous embodiments comprising, for example, an arrayed waveguide grating (AWG). The advantage of this type of compensator is its deployment where each channel signal requires a predetermined or different amount of chromatic dispersion compensation. However, in this embodiment an Echelle multiplexer is deployed which can be implemented in integrated form on a PIC chip employing an In-based alloy system. CDC 100 comprises free space regions 102 and 108 that respectively include Echelle gratings 103 and 109. A plurality of waveguide arms 106 are coupled between free space regions 102 and 108 as in the case of a standard design of an AWG. The multiplexed channel signals, $\lambda_1, \ldots, \lambda_N$, are an input to either free space region 102 and 108, such as via waveguide 101 which is synonymous to waveguide 13, for example, in connection with the previous embodiments. In practice, these arrayed waveguides with the aid of Echelle gratings 103 and 109 demultiplexes the signal input into various wavelength components into the separate waveguide arms 106, but the wavelength separation is much finer than that of a regular channel combiner per se, i.e., there is a separation of individual wavelength components on each channel signal itself over a free spectral range (FSR) spanning only the channel width, where a channel width, for example, may be typically 200 GHz. Note that the recursive or "wrap around" property of this class of multiplexers in this and in other embodiments allows one CDC device to compensate a large number of channels. The channel signal components are subjected to a phase shift to change the group delay of the channel signals when recombined from the channel signal components. The induced phase shifts provide for an opposite group delay achieving channel signal pulse narrowing. Since each channel signal has some finite linewidth, CDC device 100 samples the wavelengths across the finite signal linewidth. Arrayed waveguide arms 106 are of varying length. The channel signals are re-multiplexed at the opposite end free space region and provided as CDC channel signals at waveguide output 101. In this embodiment of FIG. 10, CDC 100 may provide further chromatic dispersion compensation upon reflection at reflector 105 at output 104 forming a double pass-through system and final output at 101 or may function as a single pass-through compensation system with input at 101 and output at 104. Device 100 is optically reciprocal.

Figure 11:
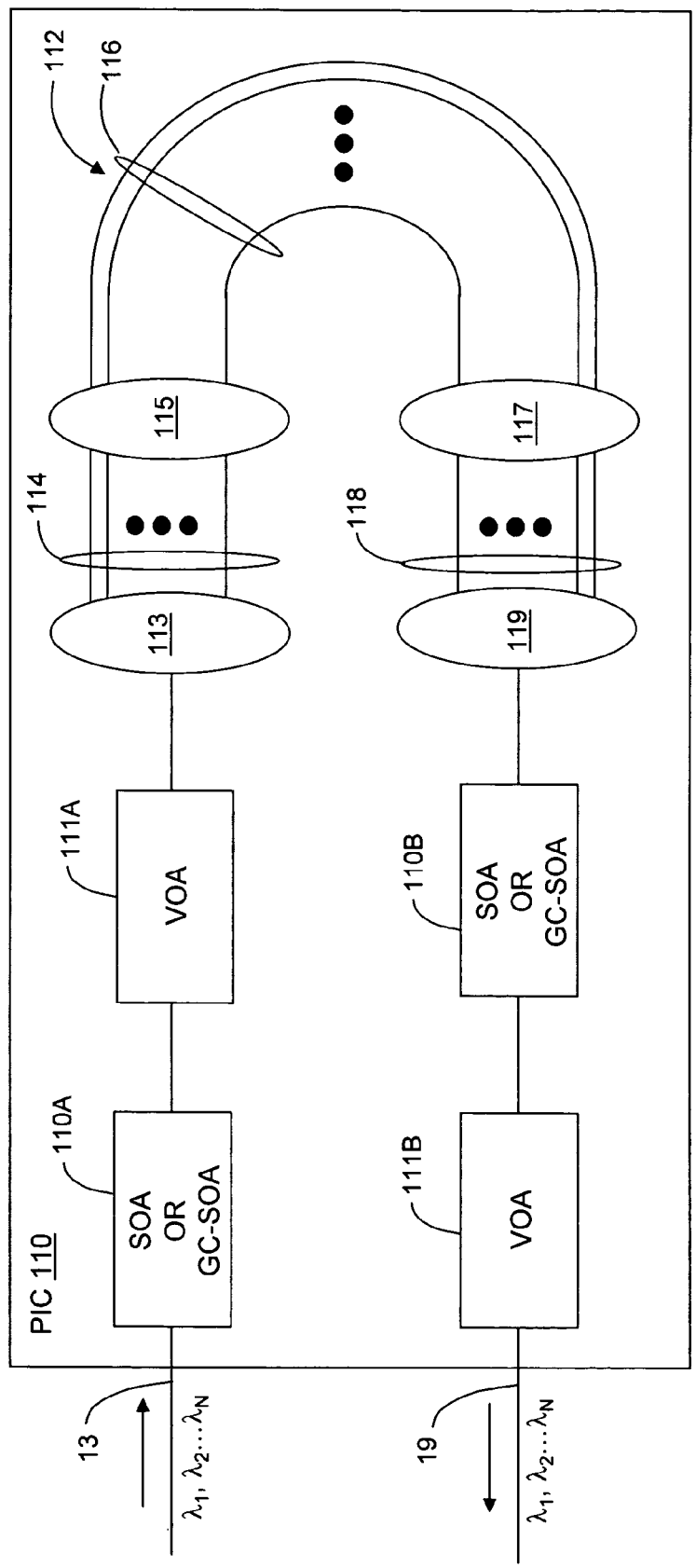
FIG. 11 is a third type of a chromatic dispersion compensator (CDC) that may be employed in any of the embodiments illustrated in FIGS. 5 and 6.

Reference is now made to FIG. 11 which illustrates further embodiment which here comprises a photonic integrated circuit or PIC chip 110, such as an In-based chip, having an input 13 to a first SOA or GC-SOA 110A followed by a first VOA 111A, functioning in the same manner as in previous embodiments providing signal amplification and equalization. This is followed by chromatic dispersion compensator (CDC) comprising AWG device 112 which comprises free space regions 113 and 115, and 117 and 119 between which are coupled a plurality of waveguide arms 114 and 118, respectively, that are substantially equal length but of different DL across the arms to provide a predetermined envelope delay across the FSR. The slightly varying arm lengths provide for a predetermined group delay dispersion of the optical signals $\lambda_1$, $\lambda_2, \ldots, \lambda_N$ via a predetermined phase shift applied via arms 114 and 118 based on the desired dispersion compensation to these signals. Thus, each waveguide arm 116 has its path length determined to induce a phase shift between input and output of PIC chip 110 to change the group delay of respective portions of one channel's spectrum when they are recombined to reduce overall pulse spreading. Free space regions 115 and 117 are, in turn, connected by a plurality of waveguide arms 118 of varying length, $\Delta L$. The functionality of input and output short length grating arms 114 and 118 are similar to that of the Echelle gratings in FIG. 10 where a separation and then recombination of individual wavelength components on each channel signal itself is carried out with intermediate dispersion compensation. After the channel signals have been compensated and recombined, they pass again onto SOA or GC-SOA 110B for further amplification and final signal equalization at 111B after which they are provided on output 19. An alternative to the embodiment to FIG. 11 would be to employ a Mach-Zehnder interferometer (MZI) or a plurality of such MZIs in place of CDC 112, or an Echelle based multiplexer for same function as the AWG MUX device shown in this embodiment.

Figure 12:
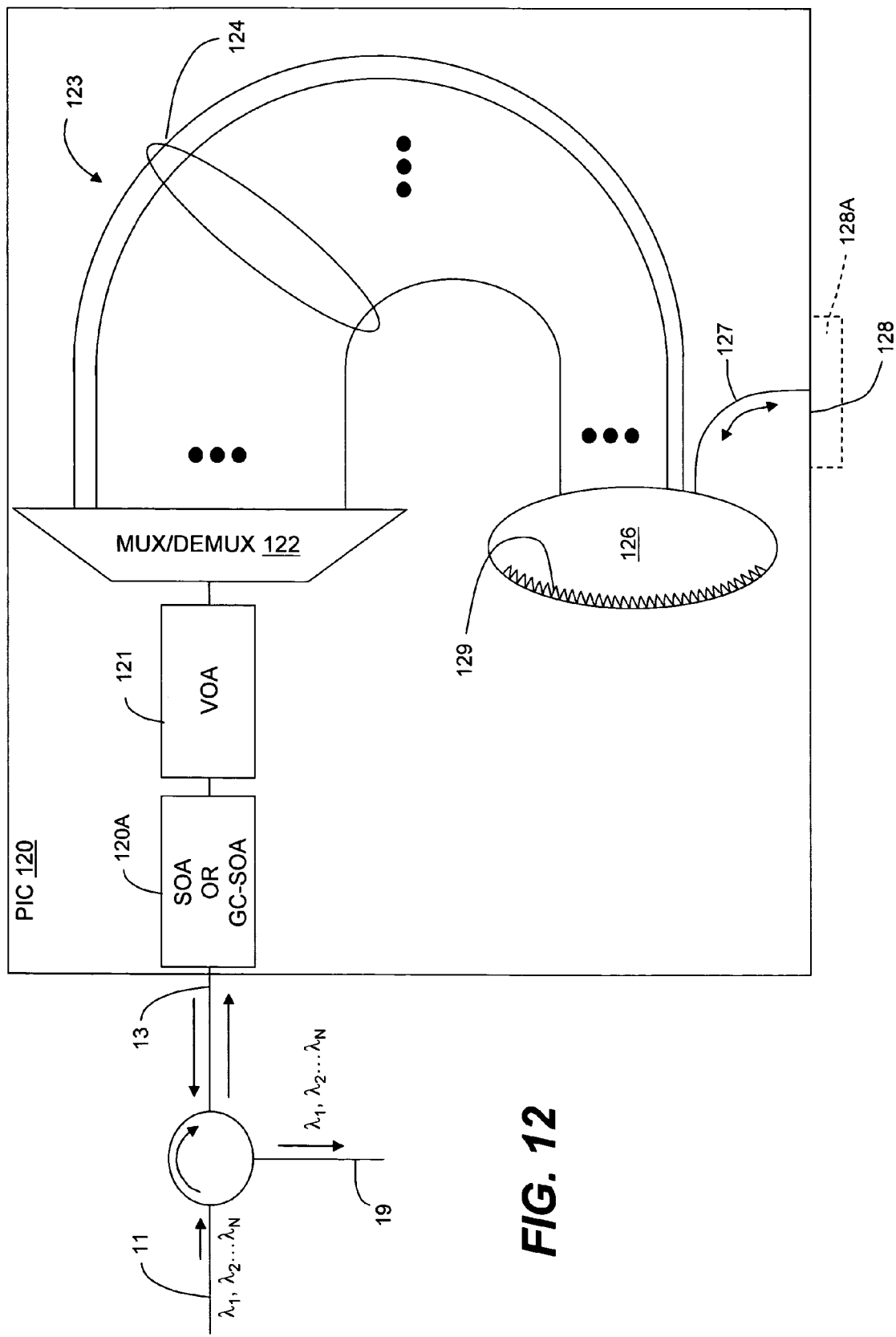
FIG. 12 is a fourth type of a chromatic dispersion compensator (CDC) that may be employed in any of the embodiments illustrated in FIGS. 3-4 and 7-8.

Reference is now made to FIG. 12 which illustrates a further embodiment of a PIC chip 120 that utilizes a CDC 123 comprising a MUX/DEMUX in combination with an Echelle grating separated by waveguide arms functioning as a compensator for chromatic dispersion. PIC chip 120 includes an SOA or GC-SOA 120A that receives the multiplexed channel signal from input/output fiber line 13 and provides signal amplification, followed by VOA 121 providing for partial channel signal equalization. As with previous embodiments, all channel signals $\lambda_1 \ldots \lambda_N$ enter DEMUX 122 and, rather than being separated from each other are each divided spectrally into components separated by only a few GHz. For example, if the channel to channel separation is 200 GHz, then the entire FSR of DEMUX 122 is 200 GHz. Each grating arm 124 would contain a portion of each signal channel's spectrum. For example, if there were forty (40) arms 124, each arm would contain 5 GHz of spectral width for each channel. The wrap-around property of the multiplexer, whether AWG-based or Echelle-based, allows the same MUX/DEMUX 122 to work simultaneously for all channels $\lambda_1 \ldots \lambda_N$. It should be noted that this concept will not be sufficiently operative for a very high channel count because chromatic dispersion of the propagating media will cause the wrap-around property to experience walkoff. But, as a practical matter, a total channels spectrum for $\lambda_1 \ldots \lambda_N$ of, for example, 80 nm is practical for InP or other semiconductor and dielectric media.

For CDC device 123, after partial chromatic compensation, the spectral components of each channel are re-multiplexed by region, which in this embodiment is illustrated as an Echelle grating 129, but region 126 could be an AWG per se or other type of multiplexer, the combined signals in waveguide 127 are then reflected at chip facet 128 which also can be a deposited mirror shown in dotted line at 128A. the signal signals then return through region 126 to be demultiplexed again and thereafter achieve further chromatic dispersion compensation via arms 124 in the reverse direction of propagation. The advantage of this geometry for chip 120 is that the chip may be half the size since the operation of the CDC is half the size and reflected upon itself for further utilization. At the same time, the active components, such as SOA 120A and VOA 121, may be operated at one half the power or attenuation value, respectively, as these devices are functionally employed twice via a double pass-through.

Figure 13:
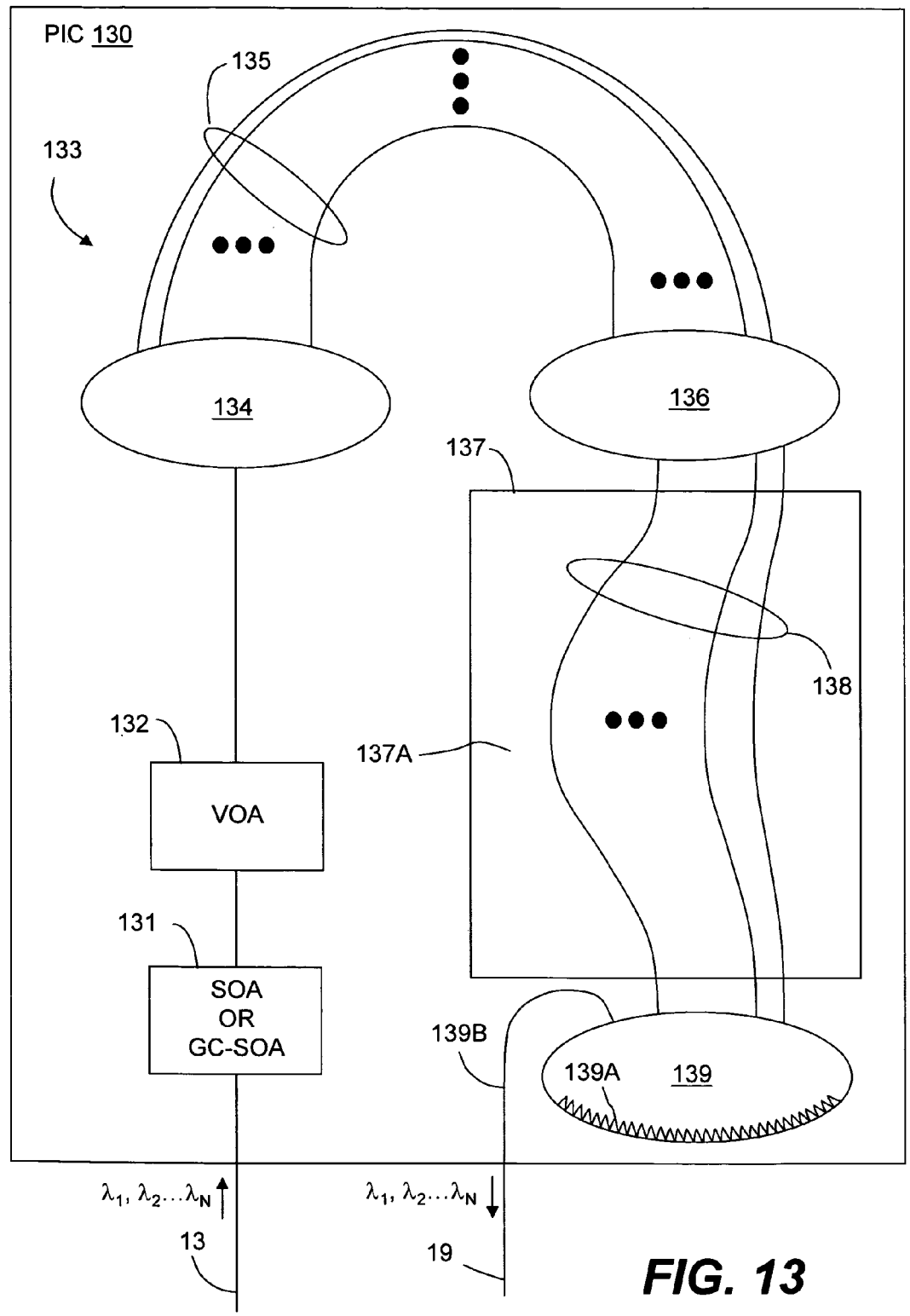
FIG. 13 is a fifth type of a chromatic dispersion compensator (CDC) that may be employed in any of the embodiments illustrated in FIGS. 5 and 6.

Reference is now made to FIG. 13 which illustrates a further embodiment of a channel equalizer/chromatic dispersion compensator or E/CDC PIC 130 which has some similarity to the structure shown in FIG. 10 but is of a pass-through design. PIC 130 comprises a tuning section at 137 which adjusts as a group the optical path lengths within the spectrum of each channel signal to introduce a relative phase shift or change relative to other spectral components of that channel. PIC chip 130 comprises at the input/output 13 of the chip SOA or GC-SAO 131 for amplifying the incoming multiplexed signal, $\lambda_1, \ldots, \lambda_N$, which signal is thereafter partially equalized at VOA 132 and then is demultiplexed into individual channel signals via a free spectral range (FSR) AWG 133. AWG 133 comprises free space regions 134 and 136 coupled by waveguide arms of varying length, $\Delta L$ which have a free spectral range (FSR) of one channel in frequency. Tuning section 137 comprises a set of waveguide arms 138 which are long waveguides compared to the length of arms 135 of AWG 133 and may number, as only a specific example and not exclusive, 40 arms, which perform the dispersion compensation function in this embodiment. Tuning section 137 includes a heater 137A which may be a heater, such as a strip heater or a TEC device as known in the art to change the ambient temperature of a region of waveguide arms 138 to provide a corresponding index change in arms 133 which is utilized to provide for better CDC from AWG 133. This tuning adjustment can be done at the factory or done in a field installation and provided with a monitoring circuit that adjusts the tuning of device 137 according to the adjustments necessary to fine tune the phase change properties of channel signal linewidths.

Once the dispersion of each channel is simultaneously compensated by essentially the same amount, the spectrum for each signal channel is simultaneously re-multiplexed by Echelle grating 139. All combined channels $\lambda_1 \ldots \lambda_N$ are then routed off PIC chip 130 via output waveguide 139B which is equivalent to output waveguide 19 in prior embodiments. This is an example of a straight-through or pass-through CDC in which any of the multiplexers employed may be AWG, Echelle or Mach-Zehnder based.

Figure 14:
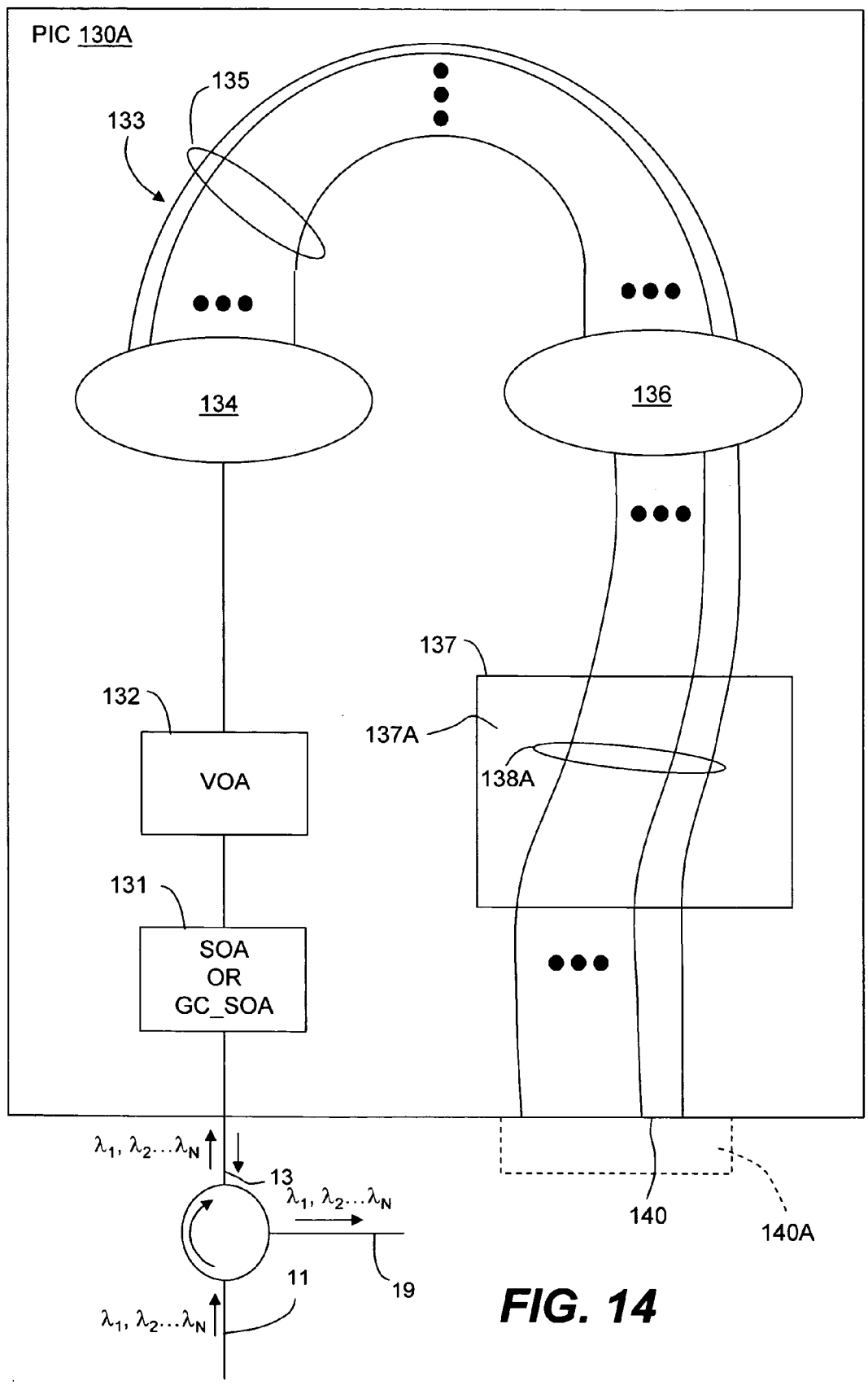
FIG. 14 is a fourth type of a chromatic dispersion compensator (CDC) that may be employed in any of the embodiments illustrated in FIGS. 3-4 and 7-8.

Reference is now made to FIG. 14 illustrating E/CDC PIC chip 130A, which is similar to PIC chip 130 of FIG. 13 except that that in tuning section 137, waveguide arms 138A in tuning section 137 are one half the length of those in tuning section 137 in the FIG. 13 embodiment because facet 140 folds the signal array back upon itself back through tuning section 137 a second time. Rather than facet 140 performing the reflection, a mirror 140A may be employed at the output of arms 138A. In addition, reflector 140 may further include a Faraday rotator(s) so that also polarization mode dispersion (PMD) may also be compensated in a manner as previously explained.

It should be realized in the embodiments of FIGS. 13 and 14, the length of FSR arms 138 will be longer than the waveguide arms 135 of AWG 133. Also, it should be further realized that tuning sections can also be applied to waveguide arms 106, 116 and 124 for the respective embodiments of FIGS. 10, 11 and 12.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An optical device comprising:
    a semiconductor chip;
    a semiconductor optical amplifier (SOA) provided on the semiconductor chip;
    an input/output configured to receive a multiplexed signal comprising a plurality of channel signals, each of the plurality of channels having a respective one of a plurality of wavelengths;
    a variable optical attenuator (VOA) provided on the semiconductor chip and coupled to said optical amplifier;
    a chromatic dispersion compensator (CDC) provided on the semiconductor chip and coupled to said variable optical attenuator; and
    a mirror provided on the semiconductor chip and coupled to said chromatic dispersion compensator, wherein the multiplexed signal is passed, in a first direction, through said semiconductor optical amplifier, said variable optical attenuator and said chromatic dispersion compensator to said mirror, and said mirror being configured to reflect said multiplexed signal in a second direction back through said chromatic dispersion compensator, said variable optical attenuator and said optical amplifier to said input output.

2. The optical device of claim 1 wherein said mirror comprises a Faraday rotator mirror (FRM).

3. The device of claim 1 wherein said chromatic dispersion compensator is a dispersion compensation fiber.

4. The optical device of claim 1 wherein said input/output of the optical device includes an optical circulator.

5. The optical device of claim 4 wherein said mirror includes a Faraday rotator mirror (FRM).

6. The optical device of claim 5 wherein said Faraday rotator mirror (FRM) is integral with said circulator.

7. The optical device of claim 1 wherein said chromatic dispersion compensator is a Mach-Zehnder interferometer (MZI).

8. The optical device of claim 1 wherein said chromatic dispersion compensator is a sequentially cascaded group of Mach-Zehnder interferometers or a treed group of Mach-Zehnder interferometers.

9. The optical device of claim 1 wherein said mirror comprises a Faraday rotator mirror (FRM), said Faraday rotator mirror (FRM) being butt coupled to a facet of said semiconductor chip to receive said multiplexed signal from said chromatic dispersion compensator.

10. The optical device of claim 1 wherein said chromatic dispersion compensator comprises an arrayed waveguide grating (AWG).

11. The optical device of claim 10 wherein said AWG comprises first and second free space regions each of which including a corresponding one of first and second Echelle gratings.

12. The optical device of claim 10 further including a demultiplexer/multiplexer coupled between said variable optical attenuator and a first end of said AWG, a second end of said AWG comprises a free space region, and a reflector in one end of said free space region reflecting demultiplexed signals back through said AWG, said reflected demultiplexed signals being multiplexed by said demultiplexer/multiplexer.

13. The optical device of claim 12 wherein said reflector includes an Echelle grating.

14. The optical of claim 12 wherein said AWG is a first AWG, said demultiplexer/multiplexer being a second arrayed waveguide grating (AWG).

15. The optical device of claim 10 wherein said AWG comprises first and second free space regions between which is a plurality of waveguide arms of different lengths ΔL, and a phase shifting section coupled to one of said first and second free space regions, and a reflector configured to receive said multiplexed signal from the mirror and direct the multiplexed signal through said phase shifting section.

16. The optical device of claim 15 wherein said phase shifting section includes a heater to adjust a phase shift of each of the plurality of channel signals.

17. The optical device of claim 15 wherein said reflector includes an Echelle grating.

18. An optical device comprising:
    an input that receives a multiplexed signal comprising a plurality of channel signals, each of which having a corresponding one of a plurality of wavelengths;
    a semiconductor chip;
    a demultiplexer provided on the semiconductor chip and having an input that receives said multiplexed signal and a plurality of outputs, each of which supplying a respective one of said plurality of channel signals;
    a plurality of semiconductor optical amplifiers provided on the semiconductor chip, each of the plurality of semiconductor optical amplifiers being coupled to a respective one of the plurality of outputs of the demultiplexer;
    a plurality of variable optical attenuators provided on the semiconductor chip, each of the plurality of variable optical attenuators being coupled to a respective one of the plurality of semiconductor optical amplifiers;
    a plurality of chromatic dispersion compensators provided on said semiconductor chip, each of the plurality of chromatic dispersion compensators being coupled to a respective one of the plurality of variable optical attenuators; and
    an optical multiplexer provided on said semiconductor chip having a plurality of inputs and an output,
    wherein each of the plurality of channel signals propagates through a corresponding one of the plurality of semiconductor optical amplifiers, a corresponding one of the plurality of variable optical attenuators, and a corresponding one of the plurality of chromatic dispersion compensators, and is supplied to a corresponding one of the plurality of inputs of the optical multiplexer, the optical multiplexer combining the plurality of channel signals at supplying the plurality of channel signals at the output.

19. The optical device of claim 18 wherein said demultiplexer and said multiplexer are arrayed waveguide gratings or Echelle gratings.

20. The optical device of claim 18 wherein said chromatic dispersion compensator is a dispersion compensation fiber.

21. The device of claim 18 wherein said chromatic dispersion compensator is a Mach-Zehnder interferometer (MZI).

22. The optical device of claim 18 wherein said chromatic dispersion compensator is a sequentially cascaded group of Mach-Zehnder interferometers or a treed group of Mach-Zehnder interferometers.

23. The optical device of claim 18 wherein said chromatic dispersion compensator comprises an arrayed waveguide grating (AWG).

24. An optical equalizer/chromatic dispersion compensator (E/CDC) comprising: a photonic integrated circuit (PIC) chip; an input to said chip for receiving a multiplexed signal comprising a plurality of multiplexed channel signals of different wavelengths; a first optical amplifier coupled to said input; a first variable optical attenuator (VOA) coupled to said first optical amplifier; a chromatic dispersion compensator (CDC) coupled to said first variable optical attenuator; a second optical amplifier coupled to an output of said chromatic dispersion compensator (CDC); a second variable optical attenuator (VOA) coupled to said second optical amplifier; said second variable optical attenuator (VOA) coupled to an output of said chip.

25. The optical equalizer/chromatic dispersion compensator (E/CDC) of claim 24 wherein said chromatic dispersion compensator (CDC) comprises at least one arrayed waveguide grating (AWG).

26. The optical equalizer/chromatic dispersion compensator (E/CDC) of claim 24 wherein said chromatic dispersion compensator (CDC) comprises a plurality of coupled arrayed waveguide gratings (AWGs).

27. The optical equalizer/chromatic dispersion compensator (E/CDC) of claim 24 wherein said chromatic dispersion compensator (CDC) comprises at least one Mach-Zehnder interferometer (MZI).

28. The optical equalizer/chromatic dispersion compensator (E/CDC) of claim 24 wherein each of said first and second optical amplifiers comprises a semiconductor optical amplifier (SOA) or a gain clamped-semiconductor optical amplifier (GC-SOA).

29. An optical device comprising:
a semiconductor chip;
an input provided on the semiconductor chip, the input being configured to receive a channel signal, the channel signal being one of a plurality channel signals in a WDM system, the channel signal having an associated free spectral range and including a plurality of wavelength components within said free spectral range;
a semiconductor optical amplifier provided on the semiconductor chip, the semiconductor optical amplifier being configured to amplify the plurality of wavelength components;
a chromatic dispersion compensator (CDC) configured to separate the plurality of wavelength and adjust a phase associated with each of the plurality of wavelength components, the chromatic dispersion compensator being configured to combine the plurality of wavelength components to reconstitute the channel signal; and
an output provided on the semiconductor chip, the output being configured to supply the reconstitute channel signal, the reconstitute channel signal having a reduced chromatic dispersion compared to a chromatic dispersion associated with the channel signal received by the input.

30. The optical device of claim 29 wherein said chromatic dispersion compensator (CDC) comprises a Mach-Zehnder interferometer (MZI) or a cascaded group of Mach-Zehnder interferometers, or at least one arrayed waveguide grating (AWG) or an Echelle grating.

31. The optical device of claim 29 wherein said input includes a first waveguide and said output includes a second waveguide.

32. The optical device of claim 29 wherein said chromatic dispersion compensator (CDC) comprises a pair of Echelle gratings separated by a plurality of waveguide arms.

33. The optical device of claim 29 wherein said chromatic dispersion compensator (CDC) comprises a multiplexer and a demultiplexer separated by a plurality of waveguide arms.

34. The optical device of claim 33 wherein said multiplexer is an arrayed waveguide grating or an Echelle grating.

35. The optical device of claim 29 wherein said chromatic dispersion compensator (CDC) comprises a plurality of waveguide arms of different lengths and a multiplexer, said each of the plurality of wavelength components propagating through a corresponding one of the plurality of waveguide arms.

36. The optical device of claim 35 further comprising a tuning section formed along at least a portion of one of said plurality of wavelength arms to vary the phase of said plurality of wavelength components propagating in said plurality of wavelength arms.

37. The optical device of claim 36 wherein said tuning section is a heater.

38. The optical device of claim 29 further comprising a variable optical attenuator (VOA) provided on said semiconductor chip, said variable optical attenuator being located between said input and said chromatic dispersion compensator (CDC) or between said output and said chromatic dispersion compensator.

39. The optical device of claim 29, wherein said semiconductor optical amplifier is located between said input and said chromatic dispersion compensator (CDC) or between said output and said chromatic dispersion compensator.

40. The optical device of claim 29 further comprising a variable optical attenuator (VOA) provided on said semiconductor chip, said variable optical attenuator and said semiconductor optical amplifier being located between said input and said chromatic dispersion compensator (CDC) or between said output and said chromatic dispersion compensator.

41. A method of providing chromatic dispersion compensation comprising the steps of:
receiving a channel signal, the channel signal including a plurality of wavelength components within a free spectral range associated with the signal channel, the channel signal being one of a plurality of channel signals in the WDM system;
amplifying the wavelength components on a semiconductor chip;
separating the wavelength components on the semiconductor chip;

shifting a phase associated with each of the wavelength components on the semiconductor chip to change a wavelength group delay associated with the channel signal;

recombining the wavelength components on the semiconductor chip to reconstitute the channel signal; and outputting the reconstituted channel signal with reduced signal chromatic dispersion compared to the received channel signal.

42. The method of claim 41 wherein the recombining the wavelength components is after the shifting the phase associated with said each of the wavelength components.

43. The method of claim 41 further comprising attenuating the separated wavelength components prior to the step of recombining said wavelength components.

44. The method of claim 41 wherein said amplifying includes amplifying the separated wavelength components prior to the step of recombining said wavelength components.

45. The method of claim 41 further comprising amplifying and attenuating the separated wavelength components prior to the step of recombining said wavelength components.

46. The method of claim 41 further comprising the step of attenuating the channel signal prior to the step of separating the wavelength components.

47. The method of claim 41 further comprising the step of amplifying the channel signal prior to the step of separating the wavelength components.

48. The method of claim 41 further comprising the step of amplifying and attenuating the channel signal prior to the step of separating the wavelength components.

* * * * *